May 15, 1962 — R. D. LICHTI — 3,034,372
CENTERING MECHANISM
Filed July 11, 1960
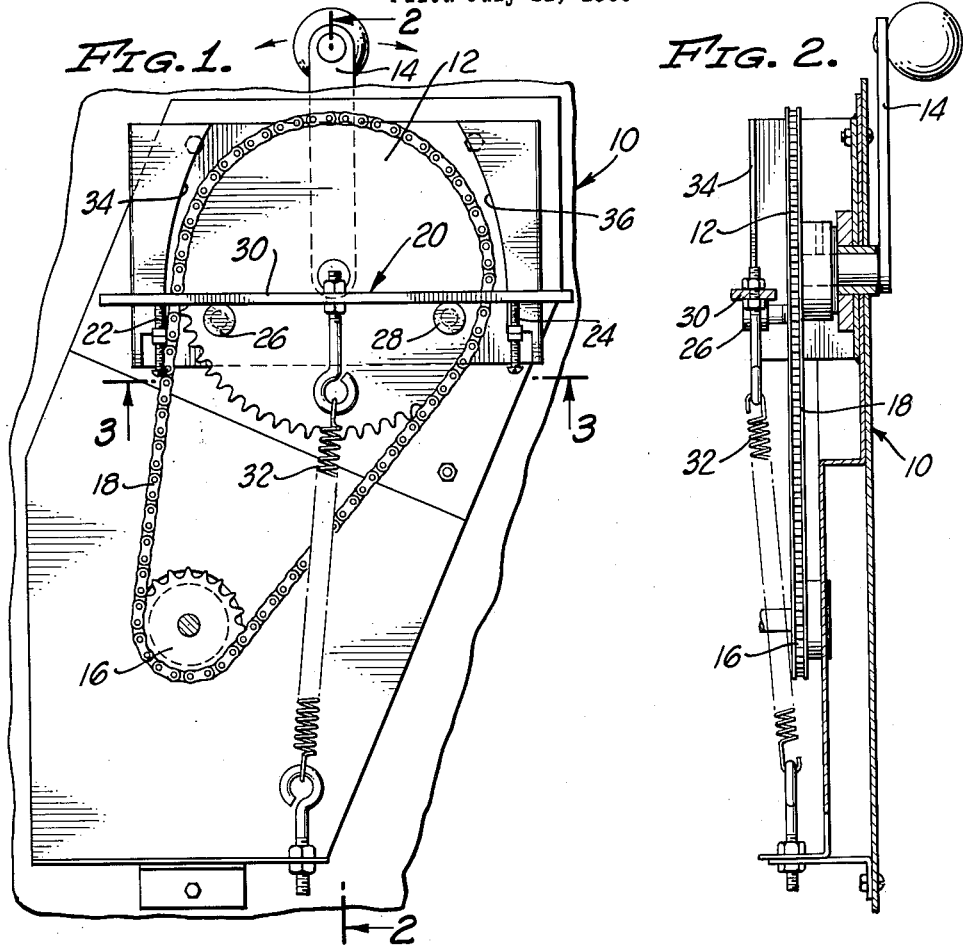
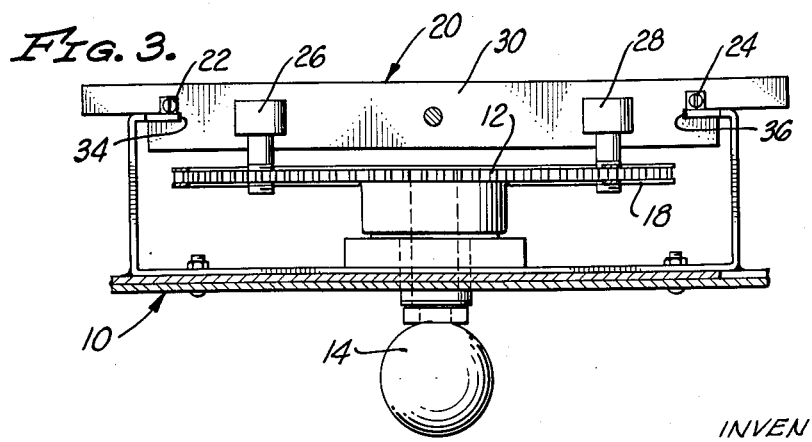
INVENTOR
ROBERT D. LICHTI
BY HIS ATTORNEYS
HARRIS, KIECH, RUSSELL & KERN United States Patent Office 3,034,372
Patented May 15, 1962

3,034,372
CENTERING MECHANISM
Robert D. Lichti, Long Beach, Calif., assignor, by mesne assignments, to Stanray Corporation, Chicago, Ill., a corporation of Delaware
Filed July 11, 1960, Ser. No. 42,056
8 Claims. (Cl. 74—470)

The present invention relates in general to a centering mechanism and, more particularly, to a centering mechanism for an oscillatory member which is pivotable about its axis in either direction relative to a centered position in performing a control function, or other function.

A general object of the invention is to provide a spring-actuated centering mechanism which utilizes only a single centering spring to avoid any necessity for properly balancing opposed centering springs against each other to obtain accurate centering of the oscillatory member.

More particularly, an important object of the invention is to provide a centering mechanism wherein the centering spring biases a centering member into engagement with two stops respectively located on opposite sides of and substantially equidistant from a plane containing the axis of oscillation of the oscillatory member and two cam elements respectively located on opposite sides of such plane, the oscillatory member being in its centered position when the centering member engages both stops and both elements.

With the foregoing construction, pivoting of the oscillatory member in one direction causes one of the cam elements thereon to pivot the centering member in the same direction about the opposite stop. When the oscillatory member is released, the centering spring pivots the centering member in the opposite direction about such opposite stop to return the oscillatory member to its centered position, wherein the centering member engages both stops and both cam elements. The actions of the centering mechanism for opposite directions of oscillatory member pivoting are identical, but reversed in direction.

Another object of the invention is to provide two track means engageable with the centering member for guiding the centering member for pivotal movement about the stops, respectively.

An important object of the invention is to provide stops which are adjustable in directions parallel to the aforementioned central plane and perpendicular to the axis of oscillation of the oscillatory member.

With the foregoing construction, the stops may be adjusted to achieve extremely accurate centering of the oscillatory member despite manufacturing inaccuracies. Consequently, generous manufacturing tolerances are available and any manufacturing errors are compensated for by adjusting the stops as required to achieve centering of the oscillatory member.

The foregoing objects, advantages, features and results of the present invention, together with various other objects, advantages, features and results thereof which will be evident to those skilled in the centering mechanism art in the light of this disclosure, may be achieved with the exemplary embodiment of the invention described in detail hereinafter and illustrated in the accompanying drawing, in which:

FIG. 1 is a plan or elevational view of a centering mechanism which embodies the invention;

FIG. 2 is a sectional view taken along the arrowed line 2—2 of FIG. 1; and

FIG. 3 is an enlarged sectional view taken along the arrowed line 3—3 of FIG. 1.

In the drawing, the numeral 10 designates a supporting structure on which is mounted an oscillatory member 12 pivotable in opposite directions from a centered position. The oscillatory member 12 may be any centerable pivoted member in any type of system requiring such a member. In the particular construction illustrated, the oscillatory member 12 is adapted to be pivoted in opposite directions from its centered position by a control lever 14 connected thereto, and is shown as comprising a master sprocket which drives a slave sprocket 16 through a chain 18. The slave sprocket 16 is rotatable about an axis spaced from and parallel to the axis of oscillation of the oscillatory member and may drive any desired apparatus, such as a rheostat controlling a reversible motor, which is movable in opposite directions from a centered position corresponding to the centered position of the oscillatory member. The diameter of the slave sprocket 16 is shown as less than that of the oscillatory member 12 to provide amplification of the pivotal movement of the oscillatory member from its centered position.

The present invention resides in a centering mechanism 20 for the oscillatory member 12 and the oscillatory member may have any desired construction and may be utilized in any desired environment without departing from the spirit of the invention. Consequently, the specific structure and environment shown are intended as illustrative only.

Considering the centering mechanism 20, it includes two stops 22 and 24 carried by the supporting structure 10 and respectively located on opposite sides of and substantially equidistant from a central plane containing the axis of the oscillatory member 12, such central plane being vertical in FIG. 1 of the drawing. The stops 22 and 24 are adjustable in directions which are parallel to the central plane of the centering mechanism 20 and which are perpendicular to the direction of the axis of the oscillatory member 12. The adjustable stops 22 and 24 are preferably simply screws threaded through portions of the supporting structure 10.

The oscillatory member 12 carries cylindrical cam elements 26 and 28 on opposite sides of and substantially equidistant from the central plane of the centering mechanism 20. When the oscillatory member 12 is in its centered position, both of the stops 22 and 24 and both of the cam elements 26 and 28 are engaged by a centering member 30 which is biased into engagement therewith by a spring 32 connected to the centering member. Preferably, the centering member 30 is a straight, rigid member engageable with the stops 22 and 24 and the cam elements 26 and 28 when the stops and the cam elements are all in a common plane perpendicular to the central plane of the centering mechanism. The spring 32 is shown as a tension spring one end of which is connected to the centering member 30 substantially in the central plane of the centering mechanism 20, and the other end of which is connected to the supporting structure 10 on the opposite side of the stops 22 and 24 and the cam elements 26 and 28 from the centering member. The spring 32 lies at least substantially in the central plane of the centering mechanism 20, but may be at an angle thereto, as shown in the drawing.

The centering member 30 is pivotable in the counterclockwise direction about the stop 22 from the centered position shown in the drawing, and is pivotable in the clockwise direction from such centered position about the stop 24. The elements 26 and 28, being cylindrical, prevent tipping of the centering member 30 about its longitudinal axis as it pivots. To guide the ends of the centering member 30 during pivotal movement thereof, the supporting structure 10 provides two tracks or track means 34 and 36 engageable with the centering member on opposite sides of the central plane of the centering mechanism 20. In the particular construction illustrated, the tracks 34 and 36 are formed by edges of portions of the supporting structure 10 receivable in corresponding notches in the centering member 30. As will be apparent, when the centering member 30 pivots in the counterclockwise direction about the stop 22, the opposite end of the centering member is guided by the track 36. Conversely, when the centering member 30 is pivoted in the clockwise direction about the stop 24, the opposite end of the centering member is guided by the track 34.

Prior to placing the centering mechanism 20 in operation, the stops 22 and 24 are carefully adjusted until the centering member 30 is in positive engagement with both the stops 22 and 24 and both the cam elements 26 and 28 when the oscillatory member 12 is in its centered position. Once these adjustments have been made, the centering spring 32 will always return the oscillatory member 12 to its centered position irrespective of the direction in which it is pivoted from its centered position.

More particularly, if the oscillatory member 12 is pivoted in the counterclockwise direction, the cam element 28 pivots the centering member 30 in the counterclockwise direction about the stop 22. Under such conditions, the centering member 30 is displaced away from the stop 24, the cam element 26 is displaced away from the centering member, and the centering spring 32 is stressed. When the oscillatory member 12 is released, the centering spring 32 pivots the centering member 30 in the clockwise direction about the stop 22, whereby the centering member acts on the cam element 28 to pivot the oscillatory member in the clockwise direction. Ultimately, the centering member 30 reengages the stop 24 and the cam element 26 reengages the centering member, whereupon the oscillatory member 12 is once again in its centered position.

The operation of the centering mechanisms 20 is similar upon clockwise pivoting of the oscillatory member 12, except that the action is reversed.

Thus, the present invention provides a simple single-spring centering mechanism 20 which is very positive in its action and which may be adjusted to achieve extreme accuracy despite manufacturing errors, whereby generous manufacturing tolerances are available.

Although an exemplary embodiment of the invention has been described herein for purposes of illustration, it will be understood that various changes, modifications and substitutions may be incorporated in such embodiment without departing from the spirit of the invention as defined by the claims which follow:

I claim:

1. In a centering mechanism, the combination of: a supporting structure; an oscillatory member mounted on said supporting structure for pivotal movement relative thereto about the axis of said oscillatory member; two stops mounted on said supporting structure on opposite sides of said axis; two cam elements mounted on said oscillatory member on opposite sides of said axis; a centering member engageable with said stops and said cam elements in a centered position of said oscillatory member and being pivotable relative to said supporting structure about either of said stops, said centering member being pivoted about one of said stops by that one of said cam elements which is on the opposite side of said axis from said one stop in response to displacement of said centering member from said centered position in one direction, and being pivoted about the other of said stops by the other of said cam elements in response to displacement of said centering member from said centered position in the opposite direction; a single centering spring connected to said centering member and biasing it into engagement with said stops and said cam elements; and actuating means for displacing said oscillatory member from said centered position.

2. In a centering mechanism, the combination of: a supporting structure; an oscillatory member mounted on said supporting structure for pivotal movement relative thereto about the axis of said oscillatory member; two stops mounted on said supporting structure on opposite sides of and substantially equidistant from said axis; two cam elements mounted on said oscillatory member on opposite sides of and substantially equidistant from said axis; a centering member engageable with said stops and said cam elements in a centered position of said oscillatory member and being pivotable relative to said supporting structure about either of said stops, said centering member being pivoted about one of said stops by that one of said cam elements which is on the opposite side of said axis from said one stop in response to displacement of said centering member from said centered position in one direction, and being pivoted about the other of said stops by the other of said cam elements in response to displacement of said centering member from said centered position in the opposite direction; a single centering spring connected to said centering member between said stops and between said cam elements and biasing said centering member into engagement with said stops and said cam elements; and actuating means for displacing said oscillatory member from said centered position.

3. A centering mechanism according to claim 2 wherein said stops are adjustable relative to said supporting structure in directions perpendicular to the portions of said centering member which are respectively engageable therewith.

4. A centering mechanism according to claim 2 wherein said cam elements and said stops are in a common plane in a centered position of said oscillatory member, said centering member being a straight, rigid member and said centering spring being substantially perpendicular to said common plane.

5. A centering mechanism according to claim 2 including track means on said supporting structure and engageable by said centering member for guiding said centering member for pivotal movement about either of said stops.

6. A centering mechanism according to claim 2 wherein said centering spring is a tension spring connected at one end to said centering member and connected at its other end to said supporting structure on the opposite side of said stops and said cam elements from said centering member.

7. A centering mechanism as defined in claim 2 wherein said actuating means comprises a lever connected to said oscillatory member.

8. In combination: a centering mechanism as defined in claim 2 wherein said oscillatory member is a sprocket; another sprocket spaced from and rotatable about an axis parallel to the axis of the sprocket first mentioned; and a chain trained around said sprockets and providing a driving connection therebetween.

References Cited in the file of this patent

UNITED STATES PATENTS

| | | |
|---|---|---|
| 692,217 | Sundh | Jan. 28, 1902 |
| 1,208,866 | Weishaar et al. | Dec. 19, 1916 |
| 1,473,984 | Bailhe | Nov. 13, 1923 |
| 1,520,233 | Gabriel | Dec. 23, 1924 |
| 1,593,227 | Taylor | July 20, 1926 |
| 1,845,033 | Bausch | Feb. 16, 1932 |
| 2,204,096 | Metcalf | June 11, 1940 |
| 2,531,764 | Binus et al. | Nov. 28, 1950 |
| 2,688,261 | Hansen | Sept. 7, 1954 |
| 2,756,610 | Hibbard | July 31, 1956 |
| 2,938,405 | West | May 31, 1960 |